(12) United States Patent
Morita et al.

(10) Patent No.: US 12,068,643 B2
(45) Date of Patent: Aug. 20, 2024

(54) MANUFACTURING METHOD FOR ROTARY ELECTRIC MACHINE ROTOR

(71) Applicants: AISIN CORPORATION, Aichi (JP); TOYOTA JIDOSHA KABUSHIKI KAISHA, Toyota (JP)

(72) Inventors: Takeru Morita, Kariya (JP); Shigeki Ideue, Kariya (JP); Yuta Watanabe, Kariya (JP); Kenji Dozono, Kariya (JP); Masashi Ikemura, Toyota (JP); Toshihiko Kamiya, Toyota (JP)

(73) Assignees: AISIN CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 579 days.

(21) Appl. No.: 17/417,681

(22) PCT Filed: Jan. 28, 2020

(86) PCT No.: PCT/JP2020/002989
§ 371 (c)(1),
(2) Date: Jun. 23, 2021

(87) PCT Pub. No.: WO2020/170734
PCT Pub. Date: Aug. 27, 2020

(65) Prior Publication Data
US 2022/0123630 A1 Apr. 21, 2022

(30) Foreign Application Priority Data
Feb. 22, 2019 (JP) .................................. 2019-030427

(51) Int. Cl.
*H02K 15/02* (2006.01)
*H02K 1/24* (2006.01)
*H02K 1/30* (2006.01)

(52) U.S. Cl.
CPC ........... *H02K 15/022* (2013.01); *H02K 1/246* (2013.01); *H02K 1/30* (2013.01); *Y10T 29/49012* (2015.01)

(58) Field of Classification Search
CPC ...... H02K 15/022; H02K 15/028; H02K 1/28; H02K 15/14; Y10T 29/49012
(Continued)

(56) References Cited

U.S. PATENT DOCUMENTS

| 2013/0111891 A1 | 5/2013 | Iwase et al. | |
| 2014/0197703 A1* | 7/2014 | Chamberlin | ........... H02K 9/223 310/64 |

(Continued)

FOREIGN PATENT DOCUMENTS

| JP | H03-143250 A | 6/1991 |
| JP | 2013-074736 A | 4/2013 |

(Continued)

OTHER PUBLICATIONS

Apr. 7, 2020 International Search Report issued in International Patent Application No. PCT/JP2020/002989.
(Continued)

*Primary Examiner* — Thiem D Phan
(74) *Attorney, Agent, or Firm* — Oliff PLC

(57) ABSTRACT

A rotary electric machine rotor includes a rotor core and a core support member that supports the rotor core. The core support member includes a tubular portion formed in a tubular shape and a support portion supported so as to be rotatable with respect to a non-rotary member to support the tubular portion from the inner side in a radial direction. The core support member is formed such that a diameter of a fitting surface portion in a specific region, which includes an overlapping region which overlaps a connection region as viewed in the radial direction, is smaller than a diameter of (Continued)

the fitting surface portion in a general region which is a region other than the specific region.

8 Claims, 5 Drawing Sheets

(58) Field of Classification Search
USPC .............. 29/598, 596, 604, 609, 732, 738
See application file for complete search history.

(56) References Cited

U.S. PATENT DOCUMENTS

| | | |
|---|---|---|
| 2014/0305389 A1 | 10/2014 | Iwase et al. |
| 2014/0305721 A1 | 10/2014 | Iwase et al. |
| 2014/0311425 A1 | 10/2014 | Iwase et al. |
| 2018/0003107 A1 | 1/2018 | Iwase et al. |
| 2019/0145312 A1 | 5/2019 | Iwase et al. |

FOREIGN PATENT DOCUMENTS

| | | | |
|---|---|---|---|
| JP | 2013-095390 A | 5/2013 | |
| JP | 2015-119556 A | 6/2015 | |
| JP | 2017-022849 A | 1/2017 | |
| JP | 2017-221078 A | 12/2017 | |

OTHER PUBLICATIONS

Dec. 16, 2021 Extended European Search Report issued for European Patent Application No. 20759438.3.

* cited by examiner

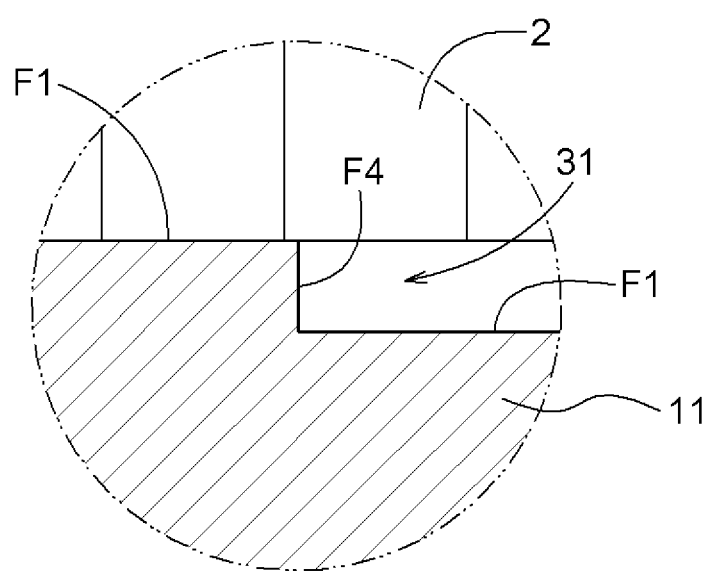

MANUFACTURING METHOD FOR ROTARY ELECTRIC MACHINE ROTOR

TECHNICAL FIELD

The present disclosure relates to a manufacturing method for a rotary electric machine rotor that includes a rotor core and a core support member that supports the rotor core.

BACKGROUND ART

The background art will be described below. Symbols and names given in parentheses in the following description are the symbols and the names used in the related-art document. A conventional example of the rotary electric machine rotor is described in Japanese Unexamined Patent Application Publication No. 2013-095390 (JP 2013-095390 A) (Patent Document 1). In the rotary electric machine rotor according to Patent Document 1, a core support member (rotor support member 22) includes a tubular portion (rotor holding portion 25) formed in a tubular shape and a support portion (radially extending portion 26) that supports the tubular portion from the radially inner side (R1). In the rotary electric machine rotor, the support portion is connected to a connection region that is a part of the tubular portion in the axial direction, and formed so as to extend from the connection region toward the inner side in the radial direction. The inner peripheral surface of a rotor core is fitted with the outer peripheral surface of the tubular portion to manufacture the rotary electric machine rotor.

RELATED-ART DOCUMENTS

Patent Documents

Patent Document 1: Japanese Unexamined Patent Application Publication No. 2013-095390 (JP 2013-095390 A)

SUMMARY OF THE DISCLOSURE

Problem to be Solved by the Disclosure

In the case where the inner peripheral surface of the rotor core is fitted with the outer peripheral surface of the tubular portion as discussed above, the rotor core is occasionally fastened to the tubular portion through shrink fitting etc., for example. In the case where shrink fitting is performed, the tubular portion is inserted to the radially inner side of the rotor core with the rotor core heated to be expanded, and the rotor core is cooled to be shrunk to be fitted. In the case where the rotor core is fitted with the tubular portion in this manner, a load in the radial direction acts on both the rotor core and the tubular portion. In this event, the tubular portion is permitted to be slightly deformed radially inward in a region of the tubular portion away from the connection region with the support portion, and therefore a radial load that interacts on the rotor core and the tubular portion tends to be reduced in such a region. In a region of the tubular portion close to the connection region with the support portion, on the contrary, the tubular portion cannot be deformed radially inward because of the presence of the support portion, and therefore a radial load that interacts on the rotor core and the tubular portion is not reduced. Therefore, a relatively large radial load acts in the region close to the connection region with the support portion compared to the other regions, and stress concentration tends to occur in such a region. The rotor core is constituted by stacking thin plates. Therefore, some of the thin plates may be deformed etc. when a large radial load acts on a part of the rotor core in the axial direction to cause stress concentration.

Thus, it is desirable to achieve a manufacturing method for a rotary electric machine rotor that can reduce deviation of a radial load that interacts on a rotor core and a tubular portion among axial positions.

Means for Solving the Problem

In view of the foregoing, an aspect of the present disclosure provides a manufacturing method for a rotary electric machine rotor that includes a rotor core and a core support member that supports the rotor core, the core support member including a tubular portion formed in a tubular shape and a support portion supported so as to be rotatable with respect to a non-rotary member to support the tubular portion from an inner side in a radial direction, the core support member being formed such that the support portion is connected to a connection region which is a part of the tubular portion in an axial direction, and extends from the connection region to the inner side in the radial direction, and such that, when a portion of an outer peripheral surface of the tubular portion that overlaps the rotor core as viewed in the radial direction is defined as a fitting surface portion, a diameter of the fitting surface portion in a specific region, which includes an overlapping region which overlaps the connection region as viewed in the radial direction, is smaller than a diameter of the fitting surface portion in a general region which is a region other than the specific region, and the manufacturing method including: inserting the core support member to the inner side in the radial direction with respect to the rotor core with the rotor core expanded such that a diameter of an inner peripheral surface of the rotor core is larger than the diameter in the general region; and thereafter shrinking the rotor core relative to the tubular portion to fit the outer peripheral surface of the tubular portion and the inner peripheral surface of the rotor core with each other.

With the characteristic configuration of the manufacturing method, the diameter of the fitting surface portion of the tubular portion, which overlaps the rotor core as viewed in the radial direction, in the specific region, which includes the overlapping region which overlaps the connection region with the support portion as viewed in the radial direction, is smaller than the diameter of the fitting surface portion in the general region. Therefore, a radial load that interacts on the rotor core and the tubular portion in the specific region with the outer peripheral surface of the tubular portion and the inner peripheral surface of the rotor core fitted with each other can be reduced by an amount corresponding to the reduction in the diameter compared to the general region. Therefore, the difference between a radial load that acts on the general region of the tubular portion and a radial load that acts on the specific region can be reduced, as a result of which it is possible to reduce deviation of a radial load that interacts on the rotor core and the tubular portion among axial positions.

BRIEF DESCRIPTION OF THE DRAWINGS

FIG. 7 illustrates the shape of an end portion of a specific region according to a different embodiment.

MODES FOR CARRYING OUT THE DISCLOSURE

1. Embodiment

Figure 1:
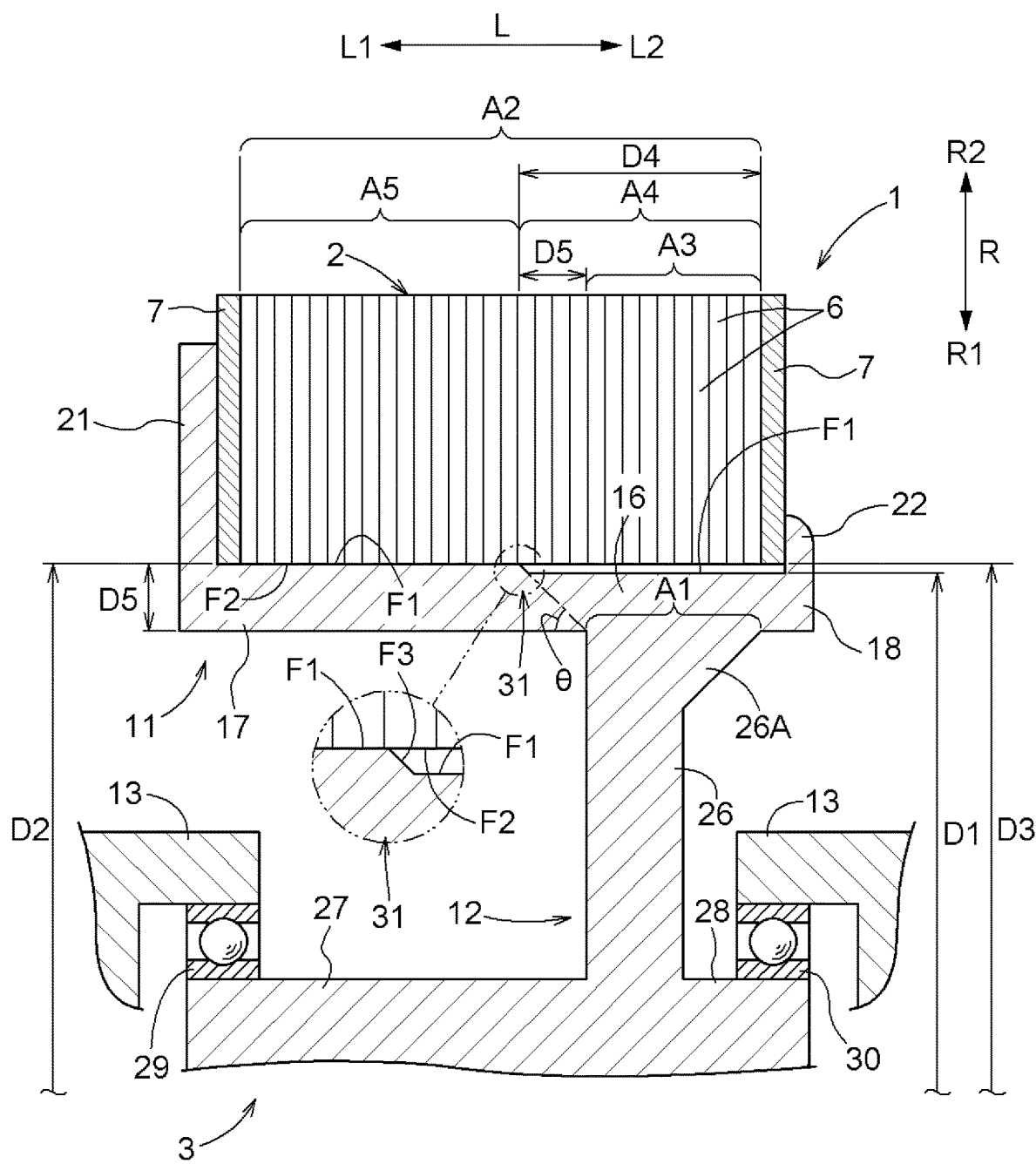
FIG. 1 is a partial sectional view of a rotary electric machine rotor.

A manufacturing method for a rotary electric machine rotor according to an embodiment will be described with reference to the drawings. As illustrated in FIG. 1, a rotary electric machine rotor 1 includes a rotor core 2 and a core support member 3 that supports the rotor core 2. In the following description, unless specifically differentiated, the "axial direction L", the "radial direction R", and the "circumferential direction" are defined with reference to the axis of the rotary electric machine rotor 1. The term "first axial side L1" represents one side (left side in FIG. 1) in the axial direction L, and the term "second axial side L2" represents the opposite side (right side in FIG. 1) from the first axial side L1. The term "radially inner side R1" represents the direction toward the inner side in the radial direction R, and the term "radially outer side R2" represents the direction toward the outer side in the radial direction R.

The rotor core 2 is constituted by stacking a plurality of electromagnetic steel plates 6, which are formed in an annular plate shape, in the axial direction L. In the present embodiment, an end plate 7 is disposed at each of both end portions of the rotor core 2 in the axial direction L.

The core support member 3 includes a tubular portion 11 formed in a tubular shape and a support portion 12 supported so as to be rotatable with respect to a case 13, which houses the rotary electric machine rotor 1, to support the tubular portion 11 from the inner side in the radial direction R. In the present embodiment, the tubular portion 11 and the support portion 12 are formed integrally with each other. An outer peripheral surface F1 of the tubular portion 11 is fitted with an inner peripheral surface F2 of the rotor core 2. The support portion 12 is connected to a connection region A1 that is a part of the tubular portion 11 in the axial direction L, and formed so as to extend from the connection region A1 toward the inner side in the radial direction R.

The tubular portion 11 includes a connection portion 16 that has the connection region A1, a first extension portion 17 formed so as to extend from the connection portion 16 toward the first axial side L1, and a second extension portion 18 formed so as to extend from the connection portion 16 toward the second axial side L2. The first extension portion 17 extends to a location on the first axial side L1 with respect to an end portion of the rotor core 2 on the first axial side L1. The second extension portion 18 extends to a location on the second axial side L2 with respect to an end portion of the rotor core 2 on the second axial side L2.

The core support member 3 also has a first projection portion 21 formed so as to project from an end portion of the first extension portion 17 on the first axial side L1 toward the radially outer side R2. The core support member 3 further has a swaged portion 22 provided at an end portion of the second extension portion 18 on the second axial side L2. The swaged portion 22 is formed by fitting the rotor core 2 with the tubular portion 11 from the second axial side L2 and thereafter bending an end portion of the second extension portion 18 on the second axial side L2 toward the radially outer side R2. The first projection portion 21 and the swaged portion 22 regulate movement of the rotor core 2 in the axial direction L with respect to the core support member 3.

The support portion 12 includes an annular portion 26 in the shape of an annular plate that extends in the radial direction R, a first supported portion 27 that projects from an end portion of the annular portion 26 on the radially inner side R1 toward the first axial side L1, and a second supported portion 28 that projects from an end portion of the annular portion 26 on the radially inner side R1 toward the second axial side L2. In the present embodiment, the rotary electric machine rotor 1 is housed in the case 13, with a first bearing 29 disposed between the first supported portion 27 and the case 13 and with a second bearing 30 disposed between the second supported portion 28 and the case 13. The support portion 12 is rotatably supported on the case 13 via the first bearing 29 and the second bearing 30. In the present embodiment, the case 13 corresponds to the non-rotary member.

In an end portion on the radially outer side R2 of the annular portion 26, the annular portion 26 has a wide portion 26A that becomes wider in the axial direction L toward the radially outer side R2. An end portion of the wide portion 26A on the radially outer side R2 is connected to the connection portion 16 of the tubular portion 11. In the present embodiment, the inner peripheral surface of the tubular portion 11 is formed so as to be parallel to the axial direction L, and the boundary between a portion with a width in the axial direction L becoming larger toward the radially outer side R2 and a portion that is parallel to the axial direction L corresponds to the boundary between the tubular portion 11 and the support portion 12.

The rotary electric machine rotor 1 is characterized in the shape of the outer peripheral surface F1 of the tubular portion 11 which is fitted with the inner peripheral surface F2 of the rotor core 2. A portion of the outer peripheral surface F1 of the tubular portion 11 that overlaps the rotor core 2 as viewed in the radial direction R is defined as a fitting surface portion A2. In the present embodiment, a portion of the outer peripheral surface F1 of the tubular portion 11 that overlaps the plurality of electromagnetic steel plates 6 of the rotor core 2 as viewed in the radial direction is defined as the fitting surface portion A2, and a portion of the outer peripheral surface F1 that overlaps each of the pair of end plates 7, which are disposed at both end portions of the rotor core 2 in the axial direction L, as viewed in the radial direction is not included in the fitting surface portion A2. However, a portion of the outer peripheral surface F1 of the tubular portion 11 that overlaps at least one of the pair of end plates 7 as viewed in the radial direction may also be defined as the fitting surface portion A2, in addition to a portion of the outer peripheral surface F1 that overlaps the plurality of electromagnetic steel plates 6 of the rotor core 2 as viewed in the radial direction.

A diameter D1 of the fitting surface portion A2 of the outer peripheral surface F1 of the tubular portion 11 in a specific region A4, which includes an overlapping region A3 which overlaps the connection region A1 as viewed in the radial direction, is smaller than a diameter D2 of the fitting surface portion A2 in a general region A5 which is a region other than the specific region A4. More particularly, when the rotor core 2 and the core support member 3 are at the same temperature, the diameter D1 in the specific region A4 is equal to or more than a diameter D3 of the inner peripheral surface F2 of the rotor core 2, and the diameter D2 in the general region A5 is larger than the diameter D3 of the inner peripheral surface F2 of the rotor core 2. The difference between the diameter D1 in the specific region A4 and the diameter D2 in the general region A5 is set to be significantly small. In the present embodiment, the difference between the diameter D1 in the specific region A4 and the diameter D2 in the general region A5 is several tens of micrometers, specifically 20 to 30 micrometers. The diameter D1 in the specific region A4 to be compared with other diameters is the diameter D1 in a portion of the specific region A4 other than an end portion 31 (inclined surface F3) to be discussed later. In the present embodiment, the diameter D1 in the specific region A4 is smaller than the diameter D2 in the general region A5 over the entire specific region A4 in the circumferential direction.

Figure 2:
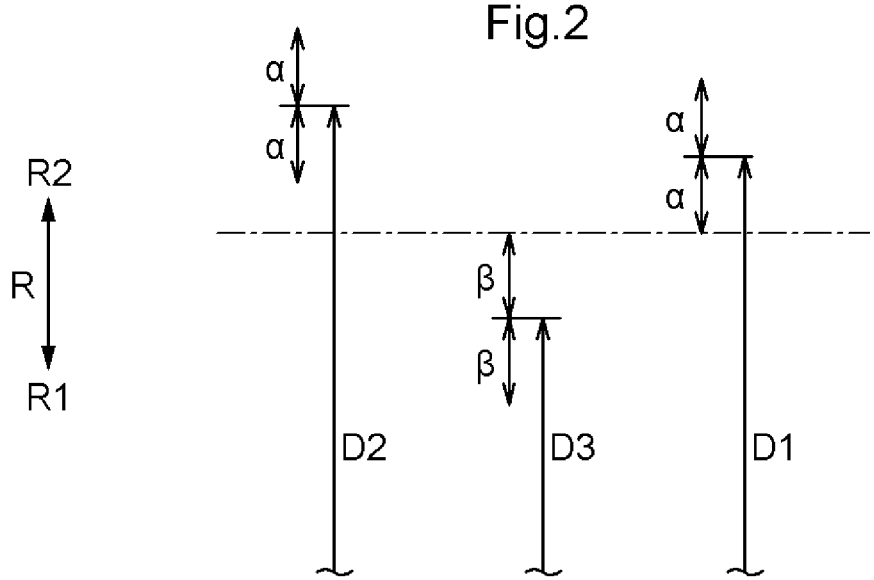
FIG. 2 illustrates the relationship among the diameter of the inner peripheral surface of a tubular portion, the diameter of an overlapping region, and the diameter of a specific region.

In the present embodiment, as illustrated in FIG. 2, when the rotor core 2 and the core support member 3 are at the same temperature, both the diameter D1 of the fitting surface portion A2 in the specific region A4 and the diameter D2 of the fitting surface portion A2 in the general region A5 are larger than the diameter D3 of the inner peripheral surface F2 of the rotor core 2. In setting such dimensions, a tolerance is set for each of the diameter D1 in the specific region A4, the diameter D2 in the general region A5, and the diameter D3 of the inner peripheral surface F2 in consideration of a manufacturing error. A first tolerance of ±α is set for the diameter D1 in the specific region A4 and the diameter D2 in the general region A5. Meanwhile, a second tolerance of ±β is set for the diameter D3 of the inner peripheral surface F2. While the tolerance for the diameter D1 in the specific region A4 and the tolerance for the diameter D2 in the general region A5 have the same value, the tolerance for the diameter D1 in the specific region A4 and the tolerance for the diameter D2 in the general region A5 may have different values.

In the present embodiment, as a preferable example, the diameter D1 of the outer peripheral surface F1 in the specific region A4, the diameter D2 of the outer peripheral surface F1 in the general region A5, and the diameter D3 of the inner peripheral surface F2 are set as follows. That is, the design value of the diameter D1 in the specific region A4 is defined as a first design value, the design value of the diameter D2 in the general region A5 is defined as a second design value, and the design value of the diameter D3 of the inner peripheral surface F2 is defined as a third design value. A value obtained by subtracting the first tolerance α from the first design value (diameter D1) and a value obtained by adding the second tolerance β to the third design value (diameter D3) are set to be equal to each other. In addition, the value obtained by adding the second tolerance β to the third design value (diameter D3) is set to be smaller than a value obtained by subtracting the first tolerance α from the second design value (diameter D2).

In setting the specific region A4, the length of the specific region A4 in the axial direction L is set to be longer than the length of the overlapping region A3 in the axial direction L. The specific region A4 is set so as to include an entirety of the overlapping region A3. Particularly, the range of the specific region A4 in the axial direction L is set so as to include the entire range of the overlapping region A3 in the axial direction L. In the present example, further, the range of the specific region A4 in the circumferential direction is set so as to include the entire range of the overlapping region A3 in the circumferential direction. In the present embodiment, the specific region A4 is set as a range interposed between two intersections between the outer peripheral surface F1 of the tubular portion 11 and two imaginary lines that extend from both end portions, in the axial direction L, of an end portion of the wide portion 26A on the radially outer side R2 and that are inclined by a set angle θ toward the outer side in the axial direction L as the imaginary lines extend toward the radially outer side R2. In the present embodiment, the set angle θ is set to 45 degrees. More particularly, an end portion of the specific region A4 on the first axial side L1 is set at an intersection between the outer peripheral surface F1 of the tubular portion 11 and an imaginary line that extends from an end portion of the wide portion 26A on the radially outer side R2 and on the first axial side L1 and that is inclined by the set angle θ toward the first axial side L1 as the imaginary line extends toward the radially outer side R2. On the other hand, an end portion of the specific region A4 on the second axial side L2 is set at an end portion of the outer peripheral surface F1 of the tubular portion 11 on the second axial side L2. This is because there is no intersection between the outer peripheral surface F1 of the tubular portion 11 and an imaginary line that extends from an end portion of the wide portion 26A on the radially outer side R2 and on the second axial side L2 and that is inclined by the set angle θ toward the second axial side L2 as the imaginary line extends toward the radially outer side R2.

In the present embodiment, as described above, the set angle θ is set to 45 degrees, and therefore a length D4 of the specific region A4 in the axial direction L is set to a length obtained by adding a length corresponding to a thickness D5 of the tubular portion 11 in the radial direction R to both sides of the overlapping region A3 in the axial direction L. In the present embodiment, the length of a portion of the tubular portion 11 on the second axial side L2 with respect to the overlapping region A3 is shorter than the length D5, and therefore the specific region A4 is shorter than a length obtained by adding a length corresponding to the thickness D5 of the tubular portion 11 in the radial direction R to both sides of the overlapping region A3 in the axial direction L. In this manner, in the case where the range of a length obtained by adding a length corresponding to the thickness D5 of the tubular portion 11 in the radial direction R to both sides of the overlapping region A3 in the axial direction L reaches an end portion of the tubular portion 11 in the axial direction L on at least one side in the axial direction L, the range to the end portion in the axial direction L is defined as the specific region A4. In the present embodiment, the thickness of the tubular portion 11 in the radial direction R at a portion at which an end portion of the wide portion 26A on the first axial side L1 is positioned in the axial direction L is used as the thickness of the tubular portion 11 in the radial direction R.

In the present embodiment, an inclined surface F3 is formed at an end portion of the specific region A4 that is adjacent to the general region A5, such that the diameter D1 becomes gradually larger toward the general region A5. In the present embodiment, the inclined surface F3 is formed at the end portion 31 of the specific region A4 on the first axial side L1. In the illustrated example, the sectional shape of the inclined surface F3 taken along the axial direction L is formed in the shape of a line extending from an end portion of the general region A5 on the second axial side L2 and inclined toward the second axial side L2 as the line extends toward the radially inner side R1.

Next, a manufacturing method for the rotary electric machine rotor 1 will be described. In the present embodiment, manufacture of the rotary electric machine rotor 1 includes a first step of inserting the core support member 3 to the radially inner side R1 with respect to the rotor core 2 with the rotor core 2 expanded, and a second step, which is performed after the first step, of shrinking the rotor core 2 relative to the tubular portion 11 to fit the outer peripheral surface F1 of the tubular portion 11 and the inner peripheral surface F2 of the rotor core 2 with each other. In the present embodiment, the rotor core 2 is expanded by heating the rotor core 2 to a high temperature compared to the core support member 3. That is, the outer peripheral surface F1 of the tubular portion 11 and the inner peripheral surface F2 of the rotor core 2 are fitted with each other through so-called shrink fitting.

Figure 3:
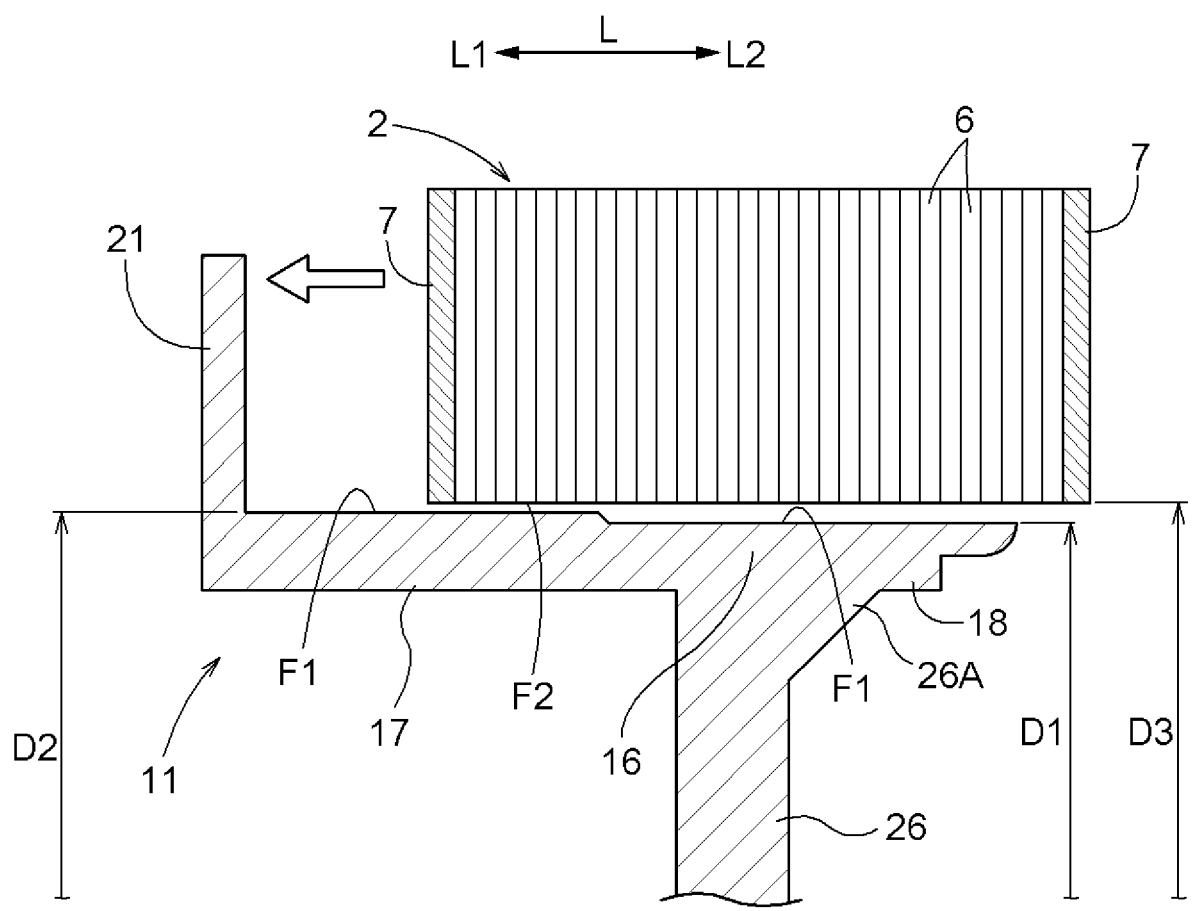
FIG. 3 illustrates a manufacturing process for the rotary electric machine rotor.

In the first step, as illustrated in FIG. 3, the core support member 3 is inserted to the radially inner side R1 with respect to the rotor core 2 with the rotor core 2 expanded such that the diameter D3 of the inner peripheral surface F2 of the rotor core 2 is larger than the diameter D2 of the tubular portion 11 in the general region A5. In the first step according to the present embodiment, the rotor core 2 is expanded such that the diameter D3 of the inner peripheral surface F2 of the rotor core 2 is larger than the diameter D2 of the tubular portion 11 in the general region A5 by heating the rotor core 2 to a high temperature compared to the core support member 3. The tubular portion 11 of the core support member 3 is inserted to the radially inner side R1 with respect to the inner peripheral surface F2 of the rotor core 2 with the rotor core 2 expanded in this manner. In the present embodiment, the tubular portion 11 is inserted into the rotor core 2 from the first axial side L1 to cause an end portion of the rotor core 2 on the first axial side L1 to abut against the first projection portion 21. After that, the second step is executed. When the tubular portion 11 is inserted to the radially inner side R1 with respect to the inner peripheral surface F2 of the rotor core 2 in this manner, the fitting surface portion A2 of the outer peripheral surface F1 of the tubular portion 11 overlaps the rotor core 2 as viewed in the radial direction, and the connection region A1 overlaps the overlapping region A3 as viewed in the radial direction.

Figure 4:
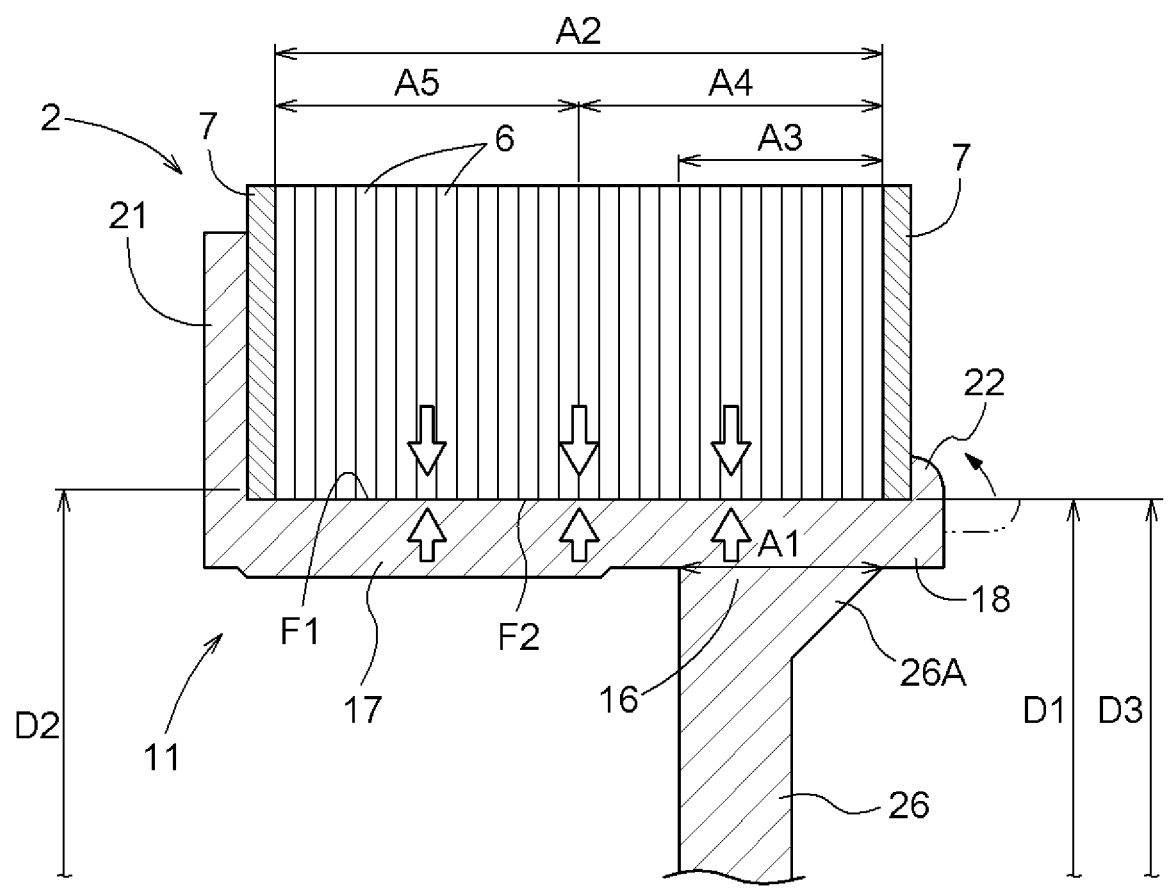
FIG. 4 illustrates a manufacturing process for the rotary electric machine rotor.

In the second step, as illustrated in FIG. 4, the rotor core 2 is shrunk relative to the tubular portion 11 of the core support member 3 to fit the outer peripheral surface F1 of the tubular portion 11 and the inner peripheral surface F2 of the rotor core 2 with each other. In the second step according to the present embodiment, the rotor core 2 that was heated to be expanded in the first step is cooled to be shrunk. The outer peripheral surface F1 of the tubular portion 11 and the inner peripheral surface F2 of the rotor core 2 are fitted with each other by shrinking the rotor core 2 with the outer peripheral surface F1 of the tubular portion 11 and the inner peripheral surface F2 of the rotor core 2 facing each other in the radial direction R. The outer peripheral surface F1 of the tubular portion 11 and the inner peripheral surface F2 of the rotor core 2 are fitted with each other through interference fitting. That is, the rotor core 2 is shrunk relative to the tubular portion 11 such that the diameter D3 of the inner peripheral surface F2 of the rotor core 2 is equal to, or smaller than, the diameter D1 in the specific region A4 on the assumption that the tubular portion 11 is not located on the radially inner side R1 with respect to the rotor core 2. In this manner, the outer peripheral surface F1 of the tubular portion 11 is fitted with the inner peripheral surface F2 of the rotor core 2 through interference fitting. In the present embodiment, as illustrated in FIG. 4, an end portion of the second extension portion 18 on the second axial side L2 is bent toward the radially outer side R2 to form the swaged portion 22 after the second step.

Consequently, movement of the rotor core 2 in the axial direction L with respect to the core support member 3 is regulated.

When the rotor core 2 is fitted in this manner, the rotor core 2 is shrunk such that the diameter D3 of the inner peripheral surface F2 of the rotor core 2 becomes equal to, or smaller than, the diameter D1 in the specific region A4 and becomes smaller than the diameter D2 in the general region A5. Consequently, a load in the radial direction R acts on both the rotor core 2 and the tubular portion 11. In this event, the tubular portion 11 is permitted to be slightly deformed toward the radially inner side R1 in a region of the tubular portion 11 away from the connection region A1 with the support portion 12, and therefore a radial load that interacts on the rotor core 2 and the tubular portion 11 tends to be reduced in such a region. In a region of the tubular portion 11 close to the connection region A1 with the support portion 12, on the contrary, the tubular portion 11 cannot be deformed toward the radially inner side R1 because of the presence of the support portion 12.

With the configuration according to the present embodiment, however, the diameter D1 in the specific region A4 is smaller than the diameter D2 in the general region A5, and therefore a radial load that interacts on the rotor core 2 and the tubular portion 11 in the specific region A4 can be reduced by an amount corresponding to the reduction in the diameter compared to the general region A5. Therefore, the difference between a radial load that acts on the general region A5 of the tubular portion 11 and a radial load that acts on the specific region A4 can be reduced, as a result of which it is possible to reduce deviation of a radial load that interacts on the rotor core 2 and the tubular portion 11 among axial positions. In FIG. 1, a gap is illustrated between the inner peripheral surface F2 of the rotor core 2 and the specific region A4 for ease of understanding. In reality, however, no gap is formed with the inner peripheral surface F2 of the rotor core 2 and the specific region A4 contacting each other as illustrated in FIG. 4.

2. Other Embodiments

Next, manufacturing methods for a rotary electric machine rotor according to other embodiments will be described.

Figure 5:
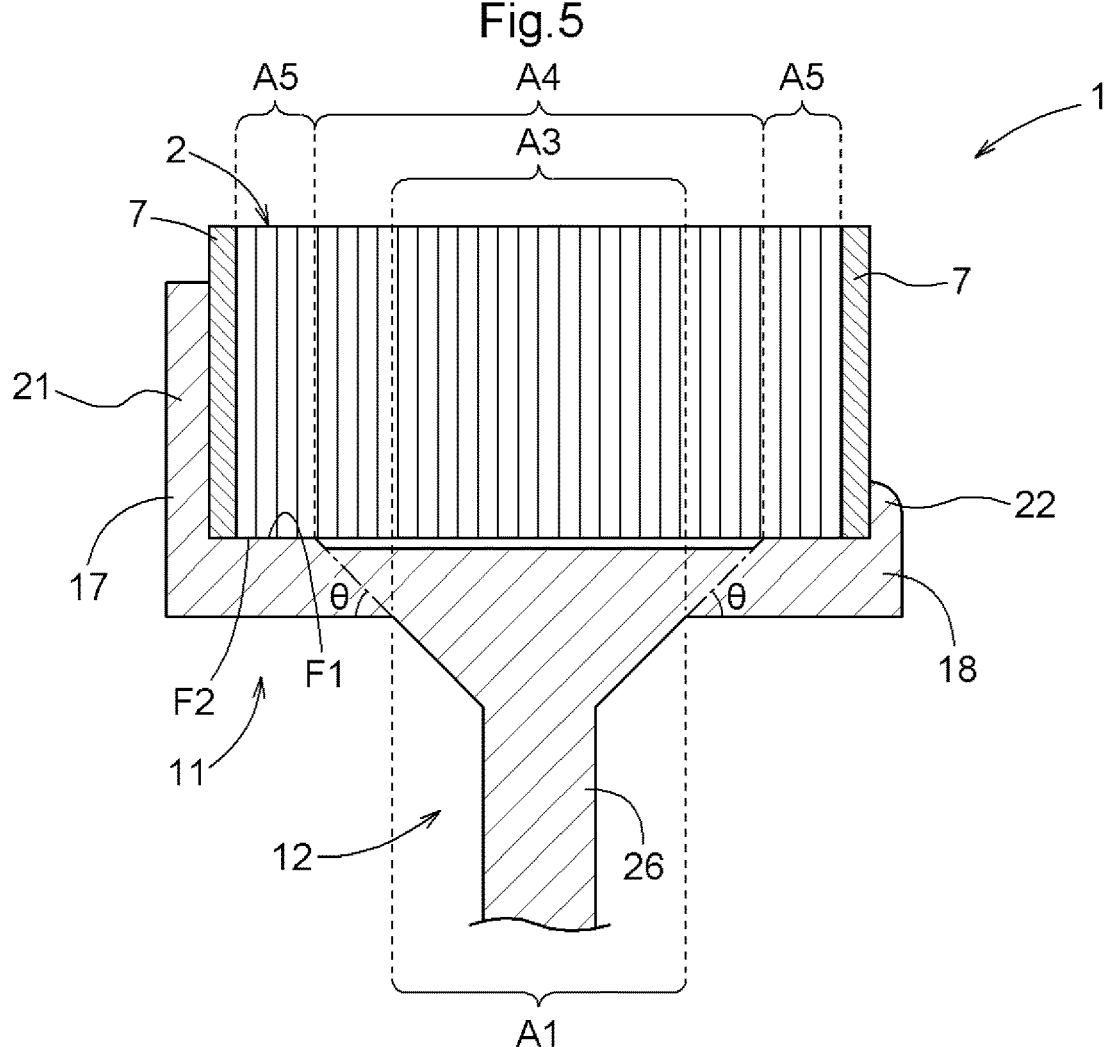
FIG. 5 is a partial sectional view of a rotary electric machine rotor according to a different embodiment.

(1) In the embodiment described above, the connection region A1 between the support portion 12 and the tubular portion 11 is set at a position offset to one side in the axial direction L with respect to the middle portion of the tubular portion 11 in the axial direction L. However, the configuration of connection between the support portion 12 and the tubular portion 11 is not limited thereto. For example, as illustrated in FIG. 5, the connection region A1 between the support portion 12 and the tubular portion 11 may be provided at the middle portion of the tubular portion 11 in the axial direction L. In the example illustrated in FIG. 5, the range from an end portion of the overlapping region A3 in the axial direction L to a length corresponding to the thickness D5 of the tubular portion 11 in the radial direction R on both sides of the overlapping region A3 in the axial direction L is secured as the specific region A4.

(2) In the embodiment described above, the length D4 of the specific region A4 in the axial direction L is set to a length obtained by adding a length corresponding to the thickness D5 of the tubular portion 11 in the radial direction R to both sides of the overlapping region A3 in the axial direction L. However, setting of the length D4 of the specific region A4 in the axial direction L is not limited thereto. For example, the length D4 of the specific region A4 in the axial direction L may be set to a length obtained by adding a length that is shorter or longer than the thickness D5 of the tubular portion 11 in the radial direction R to both sides of the overlapping region A3 in the axial direction L. Alternatively, the length D4 of the specific region A4 in the axial direction L may be set to a length that is equal to, or shorter than, the length D3 of the overlapping region A3 in the axial direction L. The range of the specific region A4 in the axial direction L may be set as a range extended to only one side in the axial direction L from the overlapping region A3. Alternatively, the range of the specific region A4 in the axial direction L may be set as a range that includes only a part of the range of the overlapping region A3 in the axial direction L.

Figure 6:
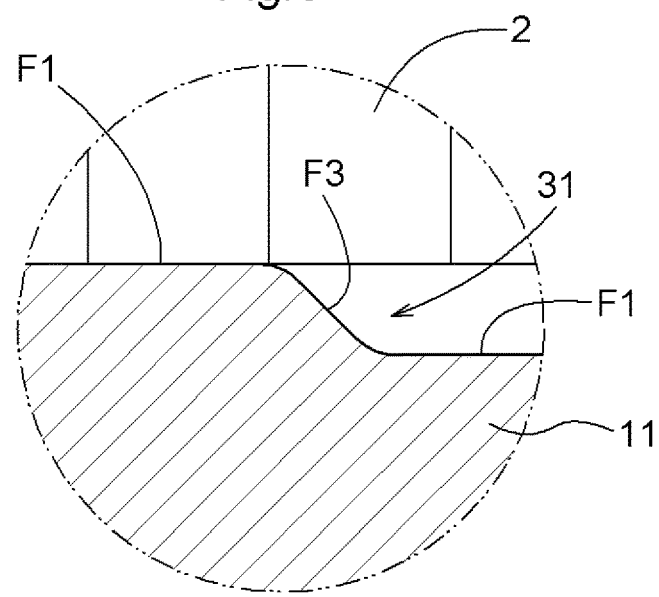
FIG. 6 illustrates the shape of an end portion of a specific region according to a different embodiment.

(3) In the embodiment described above, the inclined surface F3, the sectional shape of which taken along the axial direction L is linear, is formed at the end portion 31 of the specific region A4 which is adjacent to the general region A5. However, the shape of the end portion 31 of the specific region A4 is not limited thereto. For example, as illustrated in FIG. 6, an inclined surface F3 (S-shaped inclined surface), the inclination of which toward the radially outer side R2 becomes gradually larger toward the general region A5 and thereafter becomes gradually smaller, may be formed at the end portion 31 of the specific region A4. Alternatively, as illustrated in FIG. 7, a stepped portion F4 may be formed at the end portion 31 of the specific region A4, rather than the inclined surface F3.

(4) In the embodiment described above, the rotor core 2 is constituted by stacking the plurality of electromagnetic steel plates 6, which are formed in an annular plate shape, in the axial direction L. However, the configuration of the rotor core 2 is not limited thereto. For example, the rotor core 2 may be constituted from a sintered core or a dust core formed using magnetic powder.

(5) In the embodiment described above, the diameter D1 in the specific region A4 is smaller than the diameter D2 in the general region A5 over the entire specific region A4 in the circumferential direction. However, the diameter D1 in the specific region A4 is not limited thereto. For example, the specific region A4 may include an equal-diameter region in which the diameter D1 is equal to the diameter D2 in the general region A5 and a small-diameter region in which the diameter D1 is smaller than the diameter D2 in the general region A5. In the case where the specific region A4 includes equal-diameter regions and small-diameter regions, the equal-diameter regions and the small-diameter regions may be disposed alternately in the circumferential direction, for example.

(6) The configuration disclosed in each embodiment discussed above may be applied in combination with a configuration disclosed in any other embodiment unless any contradiction occurs. Also regarding the other configurations, the embodiment disclosed herein is merely illustrative in all respects. Thus, a variety of alterations can be made, as appropriate, without departing from the scope and spirit of the present disclosure.

3. Overview of Above Embodiment

The overview of the manufacturing method for a rotary electric machine rotor described above will be described below.

A manufacturing method for a rotary electric machine rotor (1) that includes a rotor core (2) and a core support member (3) that supports the rotor core (2), the core support member (3) including a tubular portion (11) formed in a tubular shape and a support portion (12) supported so as to be rotatable with respect to a non-rotary member (13) to support the tubular portion (11) from an inner side in a radial direction (R), the core support member (3) being formed such that the support portion (12) is connected to a connection region (A1) which is a part of the tubular portion (11) in an axial direction (L), and extends from the connection region (A1) to the inner side in the radial direction (R), and such that, when a portion of an outer peripheral surface (F1) of the tubular portion (11) that overlaps the rotor core (2) as viewed in the radial direction (R) is defined as a fitting surface portion (A2), a diameter (D1) of the fitting surface portion (A2) in a specific region (A4), which includes an overlapping region (A3) which overlaps the connection region (A1) as viewed in the radial direction (R), is smaller than a diameter (D2) of the fitting surface portion (A2) in a general region (A5) which is a region other than the specific region (A4), and the manufacturing method including: inserting the core support member (3) to the inner side in the radial direction (R) with respect to the rotor core (2) with the rotor core (2) expanded such that a diameter (D3) of an inner peripheral surface (F2) of the rotor core (2) is larger than the diameter (D2) in the general region (A5); and thereafter shrinking the rotor core (2) relative to the tubular portion (11) to fit the outer peripheral surface (F1) of the tubular portion (11) and the inner peripheral surface (F2) of the rotor core (2) with each other.

With the present configuration, the diameter (D1) of the fitting surface portion (A2) of the tubular portion (11), which overlaps the rotor core (2) as viewed in the radial direction, in the specific region (A4), which includes the overlapping region (A3) which overlaps the connection region (A1) with the support portion (12) as viewed in the radial direction, is smaller than the diameter (D2) of the fitting surface portion (A2) in the general region (A5). Therefore, a radial load that interacts on the rotor core (2) and the tubular portion (11) in the specific region (A4) with the outer peripheral surface (F1) of the tubular portion (11) and the inner peripheral surface (F2) of the rotor core (2) fitted with each other can be reduced by an amount corresponding to the reduction in the diameter compared to the general region (A5). Therefore, the difference between a radial load that acts on the general region (A5) of the tubular portion (11) and a radial load that acts on the specific region (A4) can be reduced, as a result of which it is possible to reduce deviation of a radial load that interacts on the rotor core (2) and the tubular portion (11) among axial positions.

Preferably, when the rotor core (2) and the core support member (3) are at the same temperature, the diameter (D1) in the specific region (A4) is equal to or more than the diameter (D3) of the inner peripheral surface (F2) of the rotor core (2), and the diameter (D2) in the general region (A5) is larger than the diameter (D3) of the inner peripheral surface (F2) of the rotor core (2).

With the present configuration, the entire fitting surface portion (A2), which includes the specific region (A4) and the general region (A5), of the outer peripheral surface (F1) of the tubular portion (11) can be caused to contact the inner peripheral surface (F2) of the rotor core (2) with the outer peripheral surface (F1) of the tubular portion (11) and the inner peripheral surface (F2) of the rotor core (2) fitted with each other. Thus, it is possible to appropriately secure a fastening force between the tubular portion (11) of the core support member (3) and the rotor core (2) while reducing deviation of a radial load that interacts on the rotor core (2) and the tubular portion (11) among axial positions as described above.

Preferably, a length (D4) of the specific region (A4) in the axial direction (L) is set to be longer than a length (A3) of the overlapping region (A3) in the axial direction (L).

With the present configuration, a range that is larger than the overlapping region (A3) in the axial direction (L) is determined as the specific region (A4). Consequently, a region in which a radial load that interacts on the rotor core (2) and the tubular portion (11) tends to be large because of the presence of the support portion (12) is easily included in the specific region (A4). Thus, it is possible to better reduce deviation of a radial load that interacts on the rotor core (2) and the tubular portion (11) among axial positions.

Preferably, the specific region (A4) is set so as to include an entirety of the overlapping region (A3).

With the present configuration, the range of the specific region (A4) is set so as to include the entire overlapping region (A3) which overlaps the connection region (A1) as viewed in the radial direction. Consequently, the overlapping region (A3) in which a radial load that interacts on the rotor core (2) and the tubular portion (11) tends to be large because of the presence of the support portion (12) can be included in the specific region (A4). Thus, it is possible to appropriately reduce deviation of a radial load that interacts on the rotor core (2) and the tubular portion (11) among axial positions.

Preferably, a length (D4) of the specific region (A4) in the axial direction (L) is set to a length obtained by adding a length corresponding to a thickness (D5) of the tubular portion (11) in the radial direction (R) to both sides of the overlapping region (A3) in the axial direction (L).

With the present configuration, not only the overlapping region (A3) which overlaps the connection region (A1) as viewed in the radial direction but also regions located on both sides of the overlapping region (A3) in the axial direction (L) and affected by the presence of the support portion (12) are determined as the specific region (A4). Consequently, the regions in which a radial load that interacts on the rotor core (2) and the tubular portion (11) tends to be large because of the presence of the support portion (12) can be included in the specific region (A4). Thus, it is possible to more appropriately reduce deviation of a radial load that interacts on the rotor core (2) and the tubular portion (11) among axial positions.

Preferably, a length (D4) of the specific region (A4) in the axial direction (L) is set to a length obtained by adding a length corresponding to a thickness (D5) of the tubular portion (11) in the radial direction (R) to one side of the overlapping region (A3) in the axial direction (L).

With the present configuration, not only the overlapping region (A3) which overlaps the connection region (A1) as viewed in the radial direction but also a region located on one side of the overlapping region (A3) in the axial direction (L) and affected by the presence of the support portion (12) is determined as the specific region (A4). Consequently, the region on one side of the overlapping region (A3) in the axial direction (L) in which a radial load that interacts on the rotor core (2) and the tubular portion (11) tends to be large because of the presence of the support portion (12) can be included in the specific region (A4). In addition, the degree of freedom in the position of connection of the support portion (12) to the tubular portion (11) can be enhanced, such as by connecting the support portion (12) to the tubular portion (11) such that the width, in the axial direction (L), of a region of the specific region (A4) that is present on the opposite side from the one side of the overlapping region (A3) in the axial direction (L) is smaller than a length corresponding to the thickness (D5). Thus, it is possible to enhance the degree of freedom in the position of connection of the support portion (12) to the tubular portion (11) while appropriately reducing deviation of a radial load that interacts on the rotor core (2) and the tubular portion (11) among axial positions.

Preferably, an inclined surface (F3) is formed at an end portion (31) of the specific region (A4) that is adjacent to the general region (A5), such that a diameter (D1) of the inclined surface (F3) becomes gradually larger toward the general region (A5).

With the present configuration, it is possible to reduce the possibility of occurrence of a region in which a radial load that interacts on the rotor core (2) and the tubular portion (11) is large at the boundary portion between the specific region (A4) and the general region (A5). Thus, it is possible to further appropriately reduce deviation of a radial load that interacts on the rotor core (2) and the tubular portion (11) among axial positions.

Preferably, the rotor core (2) is expanded by heating the rotor core (2) to a high temperature compared to the core support member (3).

With the present configuration, the rotor core (2) can be expanded so as to make the diameter (D3) of the inner peripheral surface (F2) of the rotor core (2) larger than the diameter (D2) in the general region (A5) using thermal expansion. In addition, the outer peripheral surface (F1) of the tubular portion (11) and the inner peripheral surface (F2) of the rotor core (2) can be fitted with each other by thereafter inserting the core support member (3) to the inner side in the radial direction (R) with respect to the rotor core (2) and shrinking the rotor core (2) relative to the tubular portion (11) by cooling the rotor core (2). That is, with the present configuration, the tubular portion (11) and the rotor core (2) can be appropriately fitted with each other through so-called shrink fitting.

INDUSTRIAL APPLICABILITY

The technology according to the present disclosure can be used for a manufacturing method for a rotary electric machine rotor that includes a rotor core and a core support member that supports the rotor core.

DESCRIPTION OF THE REFERENCE NUMERALS

1 ROTARY ELECTRIC MACHINE ROTOR
2 ROTOR CORE
3 CORE SUPPORT MEMBER
11 TUBULAR PORTION
12 SUPPORT PORTION
13 CASE (NON-ROTARY MEMBER)
A1 CONNECTION REGION
A2 FITTING SURFACE PORTION
A3 OVERLAPPING REGION
A4 SPECIFIC REGION
A5 GENERAL REGION
D1 DIAMETER IN SPECIFIC REGION
D2 DIAMETER IN GENERAL REGION
D3 DIAMETER OF INNER PERIPHERAL SURFACE
D4 LENGTH
D5 THICKNESS
F1 OUTER PERIPHERAL SURFACE
F2 INNER PERIPHERAL SURFACE

F3 INCLINED SURFACE
L AXIAL DIRECTION
R RADIAL DIRECTION

The invention claimed is:

1. A manufacturing method for a rotary electric machine rotor that includes a rotor core and a core support member that supports the rotor core, the core support member including a tubular portion formed in a tubular shape and a support portion supported so as to be rotatable with respect to a non-rotary member to support the tubular portion from an inner side in a radial direction, the manufacturing method comprising:

inserting the core support member to the inner side in the radial direction with respect to the rotor core with the rotor core expanded such that a diameter of an inner peripheral surface of the rotor core is larger than a diameter in a general region, the core support member being formed such that the support portion is connected to a connection region which is a part of the tubular portion in an axial direction, and extends from the connection region to the inner side in the radial direction, and such that, when a portion of an outer peripheral surface of the tubular portion that overlaps the rotor core as viewed in the radial direction is defined as a fitting surface portion, a diameter of the fitting surface portion in a specific region, which includes an overlapping region which overlaps the connection region as viewed in the radial direction, is smaller than the diameter of the fitting surface portion in the general region which is a region other than the specific region; and thereafter shrinking the rotor core relative to the tubular portion to fit the outer peripheral surface of the tubular portion and the inner peripheral surface of the rotor core with each other.

2. The manufacturing method for a rotary electric machine rotor according to claim 1, wherein when the rotor core and the core support member are at the same temperature, the diameter in the specific region is equal to or more than the diameter of the inner peripheral surface of the rotor core, and the diameter in the general region is larger than the diameter of the inner peripheral surface of the rotor core.

3. The manufacturing method for a rotary electric machine rotor according to claim 1, wherein a length of the specific region in the axial direction is set to be longer than a length of the overlapping region in the axial direction.

4. The manufacturing method for a rotary electric machine rotor according to claim 3, wherein the specific region is set so as to include an entirety of the overlapping region.

5. The manufacturing method for a rotary electric machine rotor according to claim 4, wherein a length of the specific region in the axial direction is set to a length obtained by adding a length corresponding to a thickness of the tubular portion in the radial direction to both sides of the overlapping region in the axial direction.

6. The manufacturing method for a rotary electric machine rotor according to claim 4, wherein a length of the specific region in the axial direction is set to a length obtained by adding a length corresponding to a thickness of the tubular portion in the radial direction to one side of the overlapping region in the axial direction.

7. The manufacturing method for a rotary electric machine rotor according to claim 1, wherein an inclined surface is formed at an end portion of the specific region that is adjacent to the general region, such that a diameter of the inclined surface becomes gradually larger toward the general region.

8. The manufacturing method for a rotary electric machine rotor according to claim 1, wherein the rotor core is expanded by heating the rotor core to a high temperature compared to the core support member.

* * * * *